United States Patent [19]

Booth

[11] Patent Number: 5,053,969
[45] Date of Patent: Oct. 1, 1991

[54] SYSTEM INCLUDING AN AUTOPILOT, WITH A SIMULATOR, FOR A FLUID BORNE VEHICLE

[75] Inventor: Thomas B. Booth, Fareham, England

[73] Assignee: Ferranti International, plc, United Kingdom

[21] Appl. No.: 340,363

[22] Filed: Apr. 19, 1989

[30] Foreign Application Priority Data

Apr. 23, 1988 [GB] United Kingdom ............. 8809649

[51] Int. Cl.[5] .................... G06F 15/50; G05D 1/08
[52] U.S. Cl. ................................... 364/433; 364/434
[58] Field of Search ................................. 364/433, 434

[56] References Cited

U.S. PATENT DOCUMENTS

| | | | |
|---|---|---|---|
| 4,525,784 | 6/1984 | Hamel et al. ..................... | 364/434 |
| 4,538,230 | 8/1985 | Reust et al. ..................... | 364/433 |
| 4,567,564 | 1/1986 | Bittner et al. .................... | 364/434 |
| 4,644,538 | 2/1987 | Cooper et al. .................. | 364/434 X |
| 4,758,958 | 7/1988 | Von Gersdorff ................. | 364/434 |

FOREIGN PATENT DOCUMENTS

WO88/09004 11/1988 PCT Int'l Appl. .

OTHER PUBLICATIONS

Richards, R. J. & Stoten, D., "Depth Control of a Submersible Vehicle", International Shipbuilding Progress, vol. 28, Feb. 1981.
Daniel, C. J. & Richards, R. J., "A Multivariable Controller for Depth Control of a Submersible Vehicle", Symposium on the Application of Multivariable System Theory, Inst. of Mgt. & Cont., Oct. 1982.
Booth, T. B., "Optimal Depth Control of an Underwater Vehicle under a Seaway", RINA International Symposium on Submarines, 1983.

*Primary Examiner*—Felix D. Gruber
*Attorney, Agent, or Firm*—Kerkam, Stowell, Kondracki & Clarke

[57] ABSTRACT

This invention relates to a system including an autopilot, with a simulator, for a fluid borne vehicle, and, in particular, to such a system including novel means to compute, in real time, and for depth keeping, and pitch keeping, purposes, any change of, or 'out-of-trim', heave force, and any change of, or 'out-of-trim', pitching moment, acting on the vehicle. For simplicity the general term out-of-trim forces is used when both are referred to.

15 Claims, 2 Drawing Sheets

SYSTEM INCLUDING AN AUTOPILOT, WITH A SIMULATOR, FOR A FLUID BORNE VEHICLE

This invention relates to a system including an autopilot, with a simulator, for a fluid borne vehicle, and, in particular, to such a system including novel means to compute, in real time, and for depth keeping, and pitch keeping, purposes, any change of, or 'out-of-trim', heave force, and any change of, or 'out-of-trim', pitching moment, acting on the vehicle. For simplicity the general term out-of-trim forces is used when both are referred to.

The term 'out-of-trim' is employed in this specification, and the accompanying claims, to refer to an imbalance of heave force and pitching moment, between external forces and the ballast or buoyancy of the vehicle in the bearing fluid, and adjustment of vehicle trim by means of ballast manipulation is referred to as trim ballast adjustment.

The fluid borne vehicle may comprise a missile, airship, aircraft, or ship. For convenience, hereinafter in this specification reference is made in relation to vehicle-specific features only to such a system for a submarine.

Also for convenience, hereinafter in this specification, and the accompanying claims, reference is made to the instantaneous out-of-trim heave force, and to the instantaneous out-of-trim pitching moment; and to signals instantaneously produced within the system. Such references are employed in the alternative to references indicating that the system operates in real time. Inherently, at least some constituent parts of the system require a finite time to respond to any input thereto.

It is conventional to express the motion of a fluid borne vehicle, say, a submarine, by equations of state-space form. Thus, the dynamics of the submarine is considered to be concerned with a set of variables, referred to as state variables. Related thereto are other variables, values of at least some of which other variables are capable of being observed, and measured.

Hereinafter in this specification, and the accompanying claims, reference is made specifically to one ordered state only, being the ordered depth of the submarine. Further, references to the state variables indicate a set of state variables employed in describing the dynamics of the submarine; and references to the observation variables indicate related variables capable of being observed, and measured; with respect to the obtaining, and/or to the maintenance, of the ordered depth.

The set of state variables are represented by a, so-called, vector of state variables; and the observation variables are represented by a, so-called, vector of state observations. The relationship between the vector of state variables, and the vector of state observations, is such that the state observations vector comprises the state variables vector transformed in accordance with a predetermined measurement matrix. The term vector refers to a column only matrix.

BACKGROUND TO THE INVENTION

Inherently, the submarine is also subjected to external disturbance forces, affecting the dynamic behavior of the submarine, and represented by a disturbance vector and such disturbance forces are caused to act when the submarine is out-of-trim, that is, heavy or light with respect to the fluid, giving heave force, or unbalanced fore-aft, giving a pitching moment, both of which constitute motion-disturbing out-of-trim forces.

It is known for a submarine to include an autopilot, the autopilot to include a controller arranged to receive, possibly inter alia, input signals or numerical values each representative of any error between the depth and an ordered depth. In response, the controller is arranged to produce a corresponding control signal, this signal determining the desired operating values or positions of controls, the controls including, for example, hydroplane deflections, or thrusters. Thus, there are caused required changes to the motion of the submarine manifested by corresponding changes of the state variables representing the dynamic behavior of the submarine, so that the submarine moves towards an ordered depth and/or maintains a depth obtained. Each control signal represents a so-called control input vector.

Hence, an autopilot can be considered to be a part of a system arranged to operate automatically upon ordered values of depth, and, in response, the autopilot is to provide desired control signals, whereby there tends to be obtained, and/or there tends to be maintained, the ordered depth of the submarine.

For convenience the inputs to and outputs from parts of the autopilot are referred to generically as 'values', irrespective of whether they are numerical values or signal levels.

It is known for the autopilot to include a controller having a linear, or proportional, transfer function and arranged to receive input values each representative of any instantaneous error between the submarine's depth, and an ordered depth; and possibly also input values each representative of the derivative of the depth error, the change of pitch angle, and the derivative of the change of pitch angle. The controller is referred to as a Proportional Derivative Controller. Such a controller operates satisfactorily only when the disturbance to which the submarine is subjected has a zero mean with respect to time. Such a controller does not cause the submarine to keep depth accurately when the submarine is out-of-trim, there then being a constant, or diverging, offset from the ordered depth.

If the controller is caused also to operate upon a term in the integral of depth error to become a Proportional Integral Derivative (PID) controller, the problem, in relation to depth keeping when the submarine is out-of-trim, is overcome, the offset being removed. With such a controller, however, there are difficulties in relation to depth keeping, and pitch keeping, when the submarine is maneuvering, for example, when changing depth.

If the motion of the submarine is expressed in the form of state-space equations, the input to the controller referred to in the preceding paragraphs can be considered to be representative of the instantaneous values of variables comprising the out-of-trim heave velocity, the out-of-trim pitch velocity, the change of pitch, and the depth error, together considered to be represented by a set, or so-called vector, of state error variables. However, the change of heave velocity cannot be measured readily; and the change of pitch velocity requires a rate gyroscope, or other instrument, rendering the system complex and expensive.

Thus, it has been proposed that, advantageously, the autopilot includes a simulator, or state estimator, to calculate, in real time, estimated values of appropriate variables, together considered to be represented by a set of values comprising a so-called vector of estimated state variables. Each value representative of this vector is operated upon, within the autopilot, to provide a corresponding value representative of a so-called vector of estimated state error variables, and these values are supplied to the controller, instead of the values representative of the vector of state error variables, referred to in the preceding paragraph.

In order to overcome the problem, in relation to depth keeping when the submarine is out-of-trim, as referred to above, integration of the depth error, as with the Proportional Integral Derivative Controller, has been proposed for an autopilot including a simulator, or state estimator. However, because with a system designed to operate upon the state-space form of equations of submarine motion, that is, all of the variables of the vector, the controller output is required to be a linear combination of its inputs, the desired integration cannot be performed by the controller. Instead and to achieve the same result, it has been proposed that the autopilot is arranged to operate upon an ancillary state error variable, comprising the integral of depth error, the required integration being performed in a part of the autopilot outside the controller. Such an arrangement is equivalent to the integration, performed by the Proportional Integral Derivative Controller, being introduced into the controller of an autopilot including a state estimator. However, as with the Proportional Integral Derivative Controller, although the problem, in relation to depth keeping when the submarine is out-of-trim, is overcome there remain difficulties in relation to depth keeping, and pitch keeping, when the submarine is maneuvering.

In particular, and in order to permit implementation of the present invention, the arrangement of such a control system with an autopilot having a state estimator includes the output of the state estimator being connected to the controller, via a differencer determining arrangement, hereinafter referred to as differencer, the differencer being arranged, in addition to receiving each output value from the state estimator, also to receive a value representative of at least a function of, that is, related to, an instantaneously ordered depth for the submarine and modifying the appropriate estimated variable value in accordance with the difference between them. In response, the differencer provides to the controller from the modified and unmodified values of estimated state variables corresponding controller input values, representative of the vector of estimated state error variables. This vector is partially representative of any instantaneous error between the estimated, and, in effect, the ordered, values of the submarine's depth, in relation to, at least the function of, the ordered depth. The controller produces, in response, an output in the form of, or translatable to, a control signal to determine the instantaneously desired values of controls of the submarine, that is, the vehicle controls, which include, for example, hydroplanes whose deflections interface with the fluid to define the submarine depth and pitch. This control signal, or rather the component values thereof, is supplied also to the state estimator, to update the values of the vector of estimated state variables computed by the state estimator.

Further, the arrangement conveniently can be considered as including, in the physical part, measurement means connected to observe the dynamic behavior of the vehicle and provide a set of values, signals or numerical data, representative of the instantaneous, observed values of the state variables, together considered as the vector of state observations. Conveniently, the autopilot can be considered also as including the equivalent of such measurement means, connected to the output of the state estimator, in the form of an autopilot observation model which produces a set of values representative of the instantaneously estimated values of the corresponding, observation variables, or the vector of estimated state observations. Each output value from the autopilot observation model is compared with the value of a corresponding variable considered to be from the measurement means of the physical part of the system in a differencer, the output of which differencer is connected to the input of the state estimator so that the estimated state computed by the state estimator is updated in response to each output signal from this differencer. This differencer provides a set of values comprising a vector of observed estimation error variables and represents the instantaneous differences between the observed values, and the estimated observed values, of the observation variables.

In accordance with the generality of the problem to all fluid born vehicles it is desirable, and comprises an object of the present invention, to provide, for a fluid borne vehicle a control system including an autopilot, with a simulator state estimator, which causes the vehicle to assume a steady or state condition in relation to state variables observed at which motion-disturbing out-of-trim forces acting on the vehicle are compensated for, novel means to compute, in real time, any out-of-trim heave force, and any out-of-trim pitching moment, either acting on, or to act on, the vehicle.

SUMMARY OF THE INVENTION

According to the present invention a control system for a fluid borne vehicle, described behaviourally by a set, comprising a vector, of state variables, includes (a) vehicle controls to effect, with vehicle motion, changes to said state variables in response to control inputs, (b) measurement means to provide a set of observed state values representative of at least some state variables of the vehicle, (c) autopilot means operable
 (i) to simulate the behavioral response of the vehicle to values of control inputs to produce a set of values representative of estimated state variables,
 (ii) to observe at least the estimated state variables corresponding to the state variables observed by the measurement means, and
 (iii) to cause, by way of said control inputs, the vehicle to assume a steady state condition in relation to state variables observed at which motion-disturbing out-of-trim forces acting on the vehicle are compensated for, and (d) an evaluation facility responsive to relationships assumed in such a steady state condition between vehicle motion defined by the autopilot means and a set of observed estimation error values, between observed state variables and observed estimated state variables, that is attributable, in such steady state condition, to motion-disturbing out-of-trim forces to derive, from a set of instantaneously observed estimation error values, values of said motion-disturbing forces.

Having evaluated such motion-disturbing out-of-trim forces, these can be displayed or otherwise indicated to the vehicle commander to use in any way. The values may be used as a result of such indication, or possibly automatically, to provide compensation for any instantaneously evaluated out-of-trim heave force, and any out-of-trim pitching moment, so that, for example, a submarine, subjected to either a varying, or a constant, disturbance, is brought to, and/or is maintained at, an ordered depth, with the submarine in trim. Having compensated for the out-of-trim heave force, and the out-of-trim pitching moment, the steady state error, associated with the dynamic behavior of the submarine, is eliminated. During any such operation, the pitch angle of the submarine remains constant.

It can be arranged that the stability of the vehicle is not affected. Further, it is not essential that the vehicle is in a steady state, for example, possibly by the vehicle maneuvering during the compensating action. In addition, the desired manner of operation of the system is unaffected by when, in a manoeuvre, a change of depth is ordered.

Thus, the deficiencies of a Proportional Integral Derivative Controller or of a system having an autopilot with a state estimator, and arranged to act in a manner equivalent to a Proportional Integral Derivative Controller, can be overcome.

For a system in accordance with the present invention, there is required to be provided a set of values representative of the observed estimation error vector, such as is provided inherently within a system having an autopilot with a state estimator. The invention is predicated on the understanding that the presence, before or after a controlled steady state is achieved by the autopilot, of an observed estimation error results from out-of-trim forces. Such observed estimation error vector has a steady value; or a mean value, with the value varying slowly compared with the response of the system. Such a slow variation of the vector is caused by a varying, unknown, and non-zero, mean disturbance acting on the vehicle, such as the so-called upward "suction force" on a submarine. If the observed estimation error vector has a steady value, there is a constant disturbance force acting on the vehicle. This vector, represented by the difference between values obtained by measurement of state variables and observation of those estimated by simulation, results from such forces and is equally constant or slowly varying, irrespective of whether or not the vehicle has reached a controlled steady state, so that relationships linking the vector to the out-of-trim forces that apply in the special case of steady state can be implemented irrespective of motion.

Compensation for any instantaneously computed motion-disturbing out-of-trim heave force, and any motion-disturbing out-of-trim pitching moment, may be provided by a control system in accordance with the present invention, by the system including trim ballast adjustment means, such as a so-called Tank Contents Controller, responsive to trim control input signals to vary the trim ballast of the vehicle in relation to the fluid and a trim ballast adjustment interface operable to transform said derived values of motion-disturbing out-of-trim forces to trim control input signals of said trim ballast adjustment means. Such a control system, in addition to having novel means to compute any out-of-trim heave force, and any out-of-trim pitching moment, also has novel means to control the amount, and distribution, of the ballast in the vehicle, so as to tend to keep the vehicle in trim.

Depending on the form of the trim ballast adjustment interface the amount and distribution of ballast to compensate for any out-of-trim heave force, and any out-of-trim pitching moment, can be controlled automatically and directly by signals or numerical values from the evaluation facility acting as control input signals to the trim ballast adjustment means or controlled manually, by the trim ballast adjustment interface comprising an operator, display means operable to display said values of motion-disturbing out-of-trim forces derived by the evaluation facility to, and be observed by, the operator and trim control input means responsive to manipulation by said operator to generate trim control input signals in accordance with the values of motion-disturbing out-of-trim forces observed by the operator.

The autopilot means, more conveniently referred to as just "the autopilot", may also include means operable to correct the ordered vertical position of the vehicle in accordance with the error of vertical position of the vehicle as represented by the constituent of a vector of state error variables representing vertical position with the vehicle considered as being in a controlled steady state and provide a corrected ordered vertical position to the autopilot means, and to determine from the difference between the instantaneous observed estimation error vector, that comprises the constituent part of the estimation error vector related to said observed vertical position, and the constituent part of the vector of estimated state error variables related to said vertical position said value of appropriate state error variable with the vehicle considered as being in the controlled steady state condition.

Conveniently, evaluations to be performed by the autopilot and evaluation facility are obtained by programming a computer of the system, in the appropriate manner, in accordance with predetermined algorithms.

BRIEF DESCRIPTION OF DRAWINGS

The present invention will now be described by way of example with reference to the accompanying drawings, in which.

THEORY OF SUBMARINE AUTOPILOT CONTROL

The symbols employed in representing submarine dynamic behavior, and relevant in relation to a system in accordance with the present invention, are as follows:

In relation to the mathematical model, for the submarine when in trim:
$U$ = Forward velocity.
$W$ = Heave velocity.
$Q$ = Pitch velocity.
$Z$ = Heave force.

M = Pitching moment.
H = Depth of the center of gravity below mean surface level.

In relation to disturbed motion of the submarine:
$\theta$ = Change of pitch.
w = Change of, or out-of-trim, heave velocity.
q = Change of, or out-of-trim, pitch velocity.
$\Delta Z$ = Change of, or out-of-trim, heave force.
$\Delta M$ = Change of, or out-of-trim, pitching moment.
h = Change of depth from a reference depth, or depth error, $= H - H_{ORD}$.
$\delta b$, $\delta s$ = Changes of, respectively, bowplane, and sternplane, deflections.

The dot above a symbol denotes differentiation with respect to time, e.g. $\dot{H}$.

The bar above a symbol denotes a value in the steady state, e.g. $\overline{U}$.

The circumflex above a symbol denotes an estimated value, or vector, e.g. $\hat{x}$.

For what is considered to be a physical part of a system, it is possible to consider the dynamic behavior of the submarine is represented by a set, comprising a vector, of state variables, with respect to the obtaining, and/or to the maintenance, of an ordered depth.

The state variables are:
w = the change of, or out-of-trim, heave velocity,
q = the change of, or out-of-trim, pitch velocity,
$\theta$ = the change of pitch angle, and
H = the depth of the center of gravity below mean surface level.

Together, these state variables can be considered as being represented by a vector, of state-space form, X, and referred to as the vector of state variables. This vector has elements:
$X_1 = w$
$X_2 = q$
$X_3 = \theta$
$X_4 = H$ Related to the set of state variables, referred to above, are observation variables, which are capable of being observed, and measured, by what can be considered to be measurement means. Together, these observation variables can be considered as being represented by a vector, of state-space form, Y, referred to as the vector of state observations. This vector has elements:
$Y_1 = H$
$Y_2 = \theta$ It can be considered that $$Y = C \cdot X$$

where C is a 2.4 transformation matrix, usually, but not necessarily, with values, $$\begin{bmatrix} 0, 0, 0, 1 \\ 0, 0, 1, 0 \end{bmatrix}$$

Thus, the relationship between the vector of state variables, and the vector of state observations, is such that the state observations vector comprises the state variables vector transformed in accordance with the predetermined, measurement matrix, C.

The differences between the values of the state variables representing the dynamics of the submarine, and the instantaneously ordered values of the state variables, together can be considered as being represented by a vector x, referred to as the vector of state error variables, $$x = X - X_{ORD}$$

where $X_{ORD}$ is the vector of the ordered values of the state variables.

In the remainder of the system and as required by the present invention, there is an autopilot with a simulator or state estimator. The state estimator models the dynamic behavior of the submarine and to calculate, in real time, the estimated values of the state variables representing the dynamics of the submarine, has an output which can be considered as being represented by a vector $\hat{X}$, the vector of the estimated state variables.

Observed values of the estimated state variables, corresponding to estimated values of the observation variables, are considered as being provided by an autopilot observation model associated with the state estimator and can be considered as being represented by a vector $\hat{Y}$, the vector of estimated observation variables.

The differences between the estimated values of the state variables, and the corresponding ordered values of the state variables, together can be considered as being represented by a vector $\hat{x}$, referred to as the vector of estimated state error variables, $$\hat{x} = \hat{X} - X_{ORD}$$

In distinction to the error terms referred to above, the differences between the values of the state variables representing the dynamics of the submarine, and the corresponding output of the state estimator, together are considered as being represented by a vector $X_E$, referred to as the estimation error vector, $$X_e = X - \hat{X} = x - \hat{x}$$

The differences between the observed values of the observation variables of the physical part of the system, and the corresponding estimated values of the observation variables, considered as being provided by the autopilot observation model associated with the state estimator, can be considered as being represented by a vector $Y_E$, referred to as the observed estimation error vector, $$Y_E = Y - \hat{Y}$$

The control values, to cause required, corresponding, changes of the state variables representing the dynamics of the submarine, include, for example, the hydroplane deflection changes. Together, these can be considered to be represented by a control input vector u, including elements $u_1$, representing, for example, bowplane deflection changes $\delta b$, and $u_2$, representing sternplane deflection changes $\delta s$.

The external disturbance forces, for example, caused by waves, and having an effect on the dynamic behavior of the submarine, together can be considered to be represented by a disturbance vector f, including elements $f_1 = \Delta Z$, and $f_2 = \Delta M$, respectively, the out-of-trim heave force, and the out-of-trim pitching moment, acting on, or to act on, the submarine.

Using the notation referred to above, the equation of motion of a submarine, and written in continuous state-space form, is, $$\dot{X} = A \cdot X + B \cdot u + D \cdot f$$

where A, B and D represent matrices of transformations considered as being performed within the system.

Additional matrices referred to below, in relation to the manner of operation of an autopilot of the system, comprise a gain matrix K representing a transformation considered as being performed by a Kalman filter; and a matrix L representing a transformation considered as being performed by the controller of the autopilot, so that control input vector $$u = L \cdot \hat{x}$$

It is also necessary to consider the derivatives of some of the terms referred to above. The symbols employed to indicate hydrodynamic and hydrostatic derivatives are:

$Z_{\dot{w}}, Z_w, Z_q,$ $M_{\dot{q}}, M_w, M_q,$ $Z_{\delta b}, Z_{\delta s}, M_{\delta b}, M_{\delta s},$ $M_\theta$.

In relation to the mass m of the submarine, when the speed of the submarine changes such that a finite increase in work is required to be done, not only to accelerate the submarine, but also to increase the kinetic energy of the water molecules, there is what can be considered mathematically to be an increase in mass. Similarly, when the submarine is pitching, there is what can be considered mathematically to be an increase in the relevant moment of inertia $I_y$ of the submarine. The effective mass of the submarine is, $$m_3 = m - Z_{\dot{w}}.$$

The effective moment of inertia in relation to pitching is, $$I_2 = I_y - M_{\dot{q}}.$$

Taking as a reference datum a submarine which is correctly trimmed and neutrally buoyant, with the hydroplanes at the balance angles, such that steady level motion is maintained at zero pitch angle, the equations of disturbed longitudinal motion, including depth keeping and pitch keeping, and in relation to the state, and control, variables, are, $$m_3 \cdot \dot{w} = Z_w w + Z_q q + Z_{\delta b} \delta b + Z_{\delta s} \delta s + \Delta Z$$

$$I_2 \cdot \dot{q} = M_w w + M_q q + M_\theta \cdot \theta + M_{\delta b} \delta b + M_{\delta s} \delta s + \Delta M$$

$$\dot{\theta} = q$$

$$\dot{h} = w - U \cdot \theta$$

Hence the equation of disturbed longitudinal motion in state-space form is, $$\dot{x} = A \cdot x + B \cdot u + D \cdot f \ldots \quad (1)$$

where $$A = \begin{bmatrix} Z_w/m_3, & Z_q/m_3, & 0, & 0 \\ M_w/I_2, & M_q/I_2, & M_\theta/I_2, & 0 \\ 0, & 1, & 0, & 0 \\ 1, & 0, & -U, & 0 \end{bmatrix}$$

$$B = \begin{bmatrix} Z_{\delta b}/m_3, & Z_{\delta s}/m_3 \\ M_{\delta b}/I_2, & M_{\delta s}/I_2 \\ 0, & 0 \\ 0, & 0 \end{bmatrix}$$

$$D = \begin{bmatrix} 1/m_3, & 0 \\ 0, & 1/I_2 \\ 0, & 0 \\ 0, & 0 \end{bmatrix}$$

The matrices A and B depend upon the forward speed U of the submarine, or a function thereof, but are otherwise constant. The matrix D is a constant. For a vehicle controlled by thrusters, instead of by hydroplanes, the hydrodynamic derivatives in the B matrix are replaced by the corresponding derivatives for thrusters.

Since the ordered values of the state variables, other than of H, are all zero, and, $\dot{H} = h$, and $A \cdot X = A \cdot x$, the equation in X corresponding to equation (1) is $$\dot{X} = A \cdot X + B \cdot u + D \cdot f \ldots \quad (2)$$

For the state estimator, the corresponding equation to equation (2) is $$\dot{\hat{X}} = A \cdot \hat{X} + B \cdot u + K \cdot (Y - \hat{Y}) \ldots \quad (3)$$

For the controller, the relevant equation is $$u = L \cdot \hat{x} \ldots \quad (4)$$

As stated above, a control system suitable for use in accordance with the present invention includes an autopilot, with a state estimator. Various different forms of controller for an autopilot are known. A simple form of controller, referred to as a Proportional Derivative Controller, is arranged to receive input signals each representative of any instantaneous error h, between the submarine's depth H, and an ordered depth $H_{ORD}$; and possibly also input signals each representative of the derivative of the depth error h, the change of pitch angle $\theta$, and the derivative of the change of pitch angle $\theta$. Such a controller operates satisfactorily only when the disturbance to which the submarine is subjected has a zero mean with respect to time. Such a controller does not cause the submarine to keep depth accurately when the submarine is out-of-trim, that is, if $\Delta Z$ and/or $\Delta M \neq 0$, there then being a constant, or diverging, offset from the ordered depth.

If the controller also operates upon a term in the integral of the depth error, $\int h \cdot dt$, the problem, in relation to depth keeping when the submarine is out-of-trim, is overcome, the offset being removed. The controller is referred to as a Proportional Integral Derivative Controller. With such a controller, however, there are difficulties in relation to depth keeping, and pitch keeping, when the submarine is maneuvering, for example, when changing depth.

Since, $$\dot{h} = w - U \cdot \theta$$

and $$\dot{\theta} = q$$

conveniently, the operation of a Proportional Derivative Controller should be capable of being expressed in terms of the state variables w, q, $\theta$ and h, together considered to be represented by the vector of state error variables, x. Further, a matrix transformation can be employed to represent the operation of the controller, in this specification referred to as a matrix transformation L, and u = L.x. Therefore, the controller should be capable of being embodied within a computer programmed, in the appropriate manner, in accordance with predetermined algorithms.

However, the state variable w, the out-of-trim heave velocity, cannot be measured readily. Further, the measurement of q, the out-of-trim pitch velocity, requires a rate gyroscope, or other instrument, implying that such a system including the autopilot is complex and expensive.

Thus, it has been proposed that, advantageously, the autopilot state estimator, calculate, in real time, estimated values of appropriate variables, together represented by the vector of estimated state variables, $\hat{X}$. Each component value of this vector is operated upon, within the autopilot, by the ordered values of state variables as described above ($\hat{X} - X_{ORD}$) to provide value representative of corresponding variables the vector of estimated state error variables $\hat{x}$, and these vector values is supplied to the controller, instead of the difficult to produce vector of state error variables, x.

In order to overcome the problem, in relation to depth keeping when the submarine is out-of-trim, as referred to above, integration of the depth error $\int h.dt$, as with the Proportional Integral Derivative Controller, has been proposed for an autopilot including a state estimator. However, because with a system designed to operate upon the state-space form of equations of submarine motion, that is, with more than one variable, the controller output, u, is required to be a linear combination of its inputs together comprising the vector of estimated state error variables $\hat{x}$, the desired integration cannot be performed by the controller. Instead, it has been proposed that the autopilot is arranged to operate upon an ancillary state error variable, comprising the integral of depth error, $x_5 = \int h.dt$, the required integration being performed in a part of the autopilot outside the controller. Such an arrangement is equivalent to the integration, performed by the Proportional Integral Derivative Controller, being introduced into the controller of an autopilot including a state estimator. As with the Proportional Integral Derivative Controller, the problem, in relation to depth keeping in an assumed steady state when the submarine is out-of-trim, is overcome. However, there remain difficulties in relation to depth, and pitch, keeping, when the submarine is maneuvering.

DETAILED DESCRIPTION OF THE PREFERRED EMBODIMENTS

There is now described a system, in accordance with the present invention, including autopilot means, referred to just as an autopilot, with a state estimator, and in which control system are embodied the state-space equations of motion of a submarine, as set out above.

Figure 1:
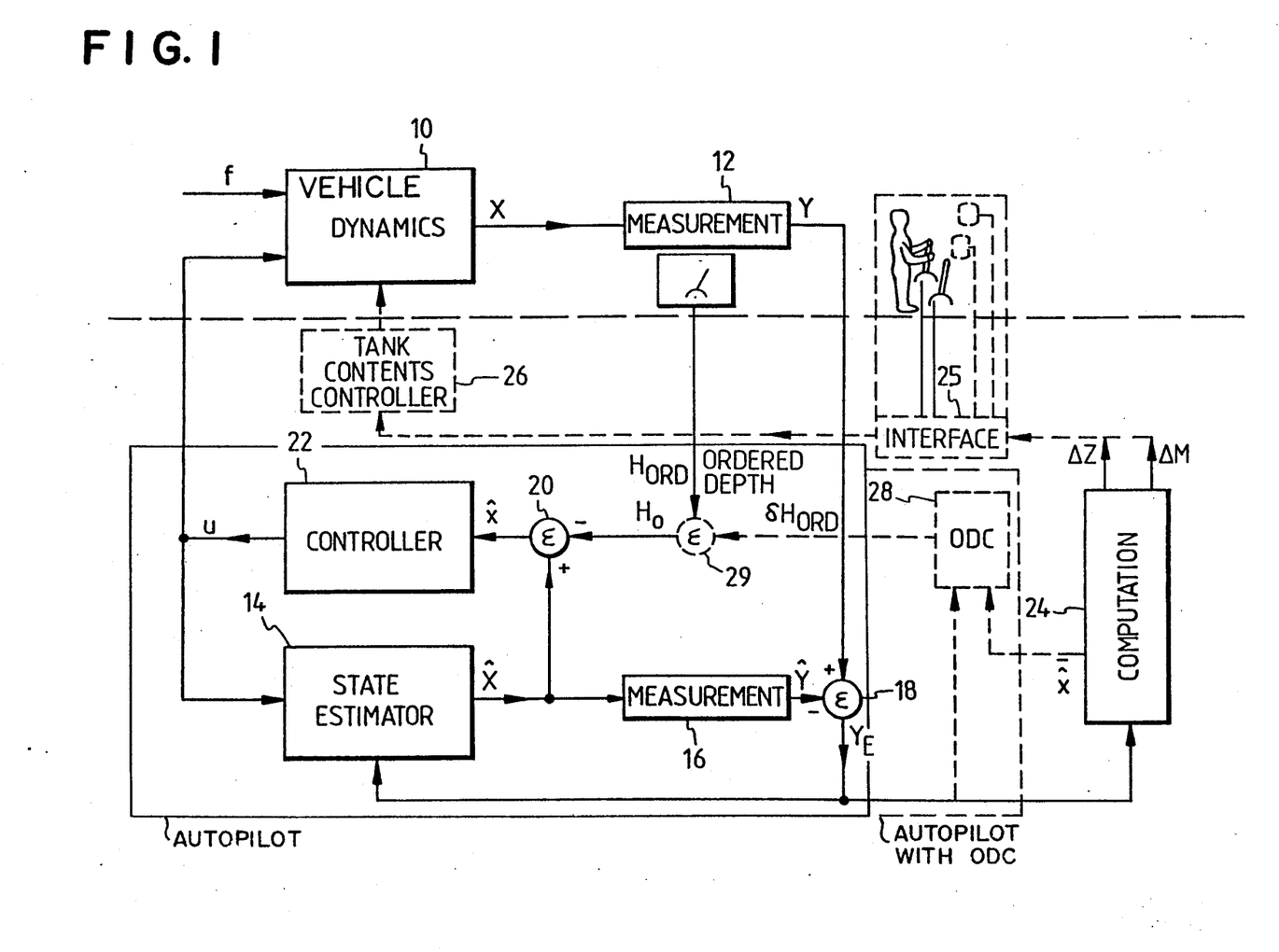
FIG. 1 is a functional block diagram of a control system, in accordance with the present invention, for a submarine, the system including an autopilot, with a simulator, or state estimator, together with an evaluation facility to compute, in real time, the out-of-trim heave force, and the out-of-trim pitching moment, acting on, or to act on, the submarine, there also being indicated, in dotted line form, how the output of the evaluation facility may be coupled to trim ballast adjustment means by way of a trim ballast adjustment interface and how possibly also an Ordered Depth Corrector, ODC, may be coupled to the evaluation facility and connected within the system.

A functional block diagram of the system is shown in FIG. 1.

A physical part of the system is considered as having means 10 to represent the submarine, in effect the dynamic behavior of the submarine, in relation to how the submarine reacts with respect to changes of the depth of the submarine are ordered, and when the submarine is subjected to external disturbances and manifested as changes of the state variables thereof. The submarine dynamics may be considered as receiving input "signals", each comprising a component of the vector of external disturbance forces f and producing "signals", each representative of the instantaneous vector of state variables X. These "signals" are considered as being supplied to measurement means 12, which, in response, is considered as providing output values, representative of the instantaneous vector of observation variables Y in convenient form for manipulation, for example as numerical values or electrical signal levels.

The autopilot, included in the remainder of the system, includes a simulator, or state estimator 14, to calculate the estimated values of the state variables, $\hat{X}$. The state estimator 14 is included in a loop with an autopilot observation model 16, corresponding to the measurement means 12 of the physical part of the system in what variables are observed and its influence on them, and a difference determining facility, more conveniently referred to as a differencer, 18. In operation, the state estimator 14 provides a set of output values representative of the vector of instantaneously estimated, state variables $\hat{X}$. This vector is considered as being supplied to the associated autopilot observation model 16, which, in response, is considered as producing a corresponding set of values representative of the vector of estimated state observations, $\hat{Y}$. The comparator 18 is arranged to compare this vector with the instantaneous vector considered to be from the measurement means 12 of the physical part of the system, representative of the vector of state observations, Y, and, in response, provides a set of values representative of the observed estimation error vector $Y_E$, or $(Y - \hat{Y})$. These vector values are fed back, via a Kalman filter, (not separately indicated in FIG. 1), to the state estimator 14, to update the estimated state computed by the state estimator. The Kalman filter prevents drift of the output of the autopilot, and smooths the effect of noise within the system upon the output of the autopilot.

Further, the arrangement of the autopilot, including the state estimator 14, is such that estimated values of the elements of the vector of estimated state variables, $\hat{w}$, $\hat{q}$, and $\hat{\theta}$, computed, in real time, by the state estimator 14, are supplied to the controller, instead of the corresponding absolute values, $\hat{w}$, $\hat{q}$, and $\hat{\theta}$, from the physical part of the system. In addition, the state estimator computes the estimated depth of the submarine $\hat{H}$, comprising the fourth element of the vector of estimated state variables, $\hat{X}$. Thus, the vector of estimated state variables X, supplied by the state estimator, has elements $\hat{X}_1 = \hat{w}$
$\hat{X}_2 = \hat{q}$
$\hat{X}_3 = \hat{\theta}$
$\hat{X}_4 = \hat{H}$ The output of the state estimator 14 is connected, via a second differencer 20, to the input of a controller 22. The second differencer 20, in addition to receiving each output value X from the state estimator 14, also receives each value representative of the instantaneously ordered depth, $H_{ORD}$, of the submarine in relation to the mean surface level; or a corrected value thereof, $H_o$, referred to below. With either arrangement, the corresponding output from the second differencer 20 is representative of the instantaneous vector of estimated state error variables $\hat{x}$, in relation to the ordered depth $H_{ORD}$, or in relation to the corrected value thereof $H_o$. The second differencer 20 determines the estimated depth error $\hat{h} = \hat{H} - H_{ORD} = \hat{H} - H_o$. Thus, the vector of estimated state error variables $\hat{x}$, supplied by the second differencer 20 to the controller 22, has elements $\hat{x}_1 = \hat{w}$
$\hat{x}_2 = \hat{q}$
$\hat{x}_3 = \hat{\theta}$
$\hat{x}_4 = \hat{h}$ The controller 22, in response to this signal, produces an output in the form of, or translatable to, control signals representative of the instantaneously required control values, or control input vector, u. This signal is supplied to the state estimator 14, to cause updating of the estimated state computed by the state estimator; and also is considered as being supplied to the vehicle 10 as another input signal, to cause changes of the state variables in the required manner.

The autopilot control system as thus far described is known within the control art, particularly in the art of controlling submarines.

To complete the system, and in accordance with the present invention, there is provided an evaluation facility 24 to compute, in real time, the out-of-trim heave force $\Delta Z$, and the out-of-trim pitching moment $\Delta M$, both of either sense, acting on the submarine. Thus, the evaluation facility 24 comprises an out-of-trim estimator.

For convenience, hereinafter in this specification, the out-of-trim heave force $\Delta Z$ is referred to as the heave force; and the out-of-trim pitching moment $\Delta M$ is referred to as the pitching moment.

Subtracting equation (3) from equation (2), $$\dot{X}_E = (A - K \cdot C) \cdot X_E + D \cdot f \ldots \quad (5)$$

Hence, for a constant speed U, the estimation error vector, $X_E$, depends solely on the external disturbance vector f, irrespective of any manoeuvre of the submarine.

The derivation of equation (5) does not assume the existence of a controller.

However, it is not possible to compute f directly from equation (5), because not all the elements of $X_E$ are known, nor is equation (5) a simple relationship. It is an appreciation of the present invention that the equation (5) can be utilized in the simplified controlled steady state conditions, when $\dot{X}_E$ is zero, and that the observed estimation error vector $Y_E$ can be employed, with L, in order to compute f.

Provided the determinant $(A - K \cdot C)$ is not singular, $X_E$ will attain a steady state value, $-(A - K \cdot C)^{-1} \cdot D \cdot f$.

It follows that the observed estimation error vector, $Y_E$, also achieves a steady state value.

Now, as stated above, $u = L \cdot \hat{x}$, from equation (4);

$A \cdot X = A \cdot x$ and $Y_E = C \cdot X_E$.

Hence, in the steady state, and from a consideration of equation (3), $\dot{\bar{x}} = 0 = A\bar{x} + B \cdot L \cdot \bar{\hat{x}} + K \cdot Y_3$, that is, $0 = (A + B \cdot L) \cdot \bar{\hat{x}} + K \cdot Y_e$ or $$\bar{\hat{x}} = -(A + B \cdot L)^{-1} \cdot K \cdot Y_e \ldots \quad (6)$$

In relation to the required manner of operation of the evaluation facility 24, and in the steady state:

$\bar{q} = 0$ $h = \bar{w} - U \cdot \bar{\theta} = \bar{0}$.

Hence $\bar{x}_2 = 0$ $$\bar{x}_1 = \bar{w} = U \cdot \bar{\theta} = U \cdot \bar{x}_3 \ldots \quad (7)$$

However, $Y_E = C \cdot X_E = C(\bar{x} - \bar{\hat{x}})$.

This can be partitioned to give, $$Y_E = [C_1 : C_2] \cdot \begin{bmatrix} \bar{x}_{12} \\ \bar{x}_{34} \end{bmatrix} - C \cdot x$$

where $$x_{12} = \begin{bmatrix} x_1 \\ x_2 \end{bmatrix}, x_{34} = \begin{bmatrix} x_3 \\ x_4 \end{bmatrix}$$

and $C_1$ and $C_2$ are the first two and the last two columns of C, respectively.

Thus $$Y_E = C_1 \bar{x}_{12} + C_2 \bar{x}_{34} p = C \cdot \bar{\hat{x}} \ldots \quad (8)$$

Now $$C_1 \cdot \bar{x}_{12} = [C_{11} : C_{12}] \cdot \begin{bmatrix} x_1 \\ x_2 \end{bmatrix} = C_{11} \cdot \bar{x}_1 + C_{12} \cdot \bar{x}_2$$

where $C_{11}$ and $C_{12}$ are the first and second columns of C, respectively.

Using equation (7), and adding a null term, $C_1 \cdot \bar{x}_{12} = U \cdot C_{11} \cdot \bar{x}_3 + [0] \cdot \bar{x}_4$
$= [U \cdot C_{11} : 0] \cdot \bar{x}_{34}$.

Let $C_3 = [U \cdot C_{11} : 0] + C_2$ and substituting in (8), $Y_E = C_3 \cdot \bar{x}_{34} - C \cdot \bar{\hat{x}}$ If $C_3$ is not singular, $$\bar{x}_{34} = C_3 - (Y_E + C \cdot \bar{x}).$$

Since $X_E = x - \hat{x}$ and using equation (7), $$\begin{aligned}
X_{E1} &= U \cdot \bar{x}_3 - \bar{x}_1 \\
X_{E2} &= \qquad\quad - \bar{x}_2 \\
X_{E3} &= \bar{x}_3 - \bar{x}_3 \\
X_{E4} &= \bar{x}_4 - \bar{x}_4
\end{aligned} \qquad (9)$$

In the special case of $C = \begin{bmatrix} 0, 0, 0, 1 \\ 0, 0, 1, 0 \end{bmatrix}$, that is, where $X_4 = Y_1$ and $X_3 = Y_2$, these equations simplify to, $$\begin{aligned}
X_{E1} &= U \cdot (Y_{E2} + \bar{x}_3) - \bar{x}_1 \\
X_{E2} &= \qquad\qquad\quad - x_2 \\
X_{E3} &= Y_{E2} \\
X_{E4} &= Y_{E1}
\end{aligned}$$

Even when the measurement matrix, C, is not of this form, the measurements usually can be corrected into the form.

$Y_E$ is known, and so is $\hat{x}$ from equation (6). Hence $X_E$ can be determined using equations (9). Further, using equation (5), D.f can be determined, since $D.f = -(A - K.C).X_E$ when $\dot{X}_E = 0$ in the steady state condition.

Let the matrix product D.f be represented by $D_f$.
Since $D(1.2) = D(2,1) = 0$ $$D_{f1} = D(1,1) \cdot f_1$$

and $$D_{f2} = D(2,2) \cdot f_2$$

Hence, the heave force $\Delta Z = f_1$ $$\begin{aligned}
\text{Hence, the heave force } \Delta Z &= f_1 \\
&= \frac{D_{f1}}{D(1,1)} \\
\text{and the pitching moment } \Delta M &= f_2 \\
&= \frac{D_{f2}}{D(2,2)}
\end{aligned} \qquad (10)$$

In particular, the evaluation facility 24 is arranged to operate upon each value output from the first differencer 18, and representative of the observed estimation error vector $Y_E$. In response, the evaluation facility 24 is arranged to provide, individually on separate outputs, a value for the instantaneous heave force $\Delta Z$, and the instantaneous pitching moment $\Delta M$.

Figure 2:
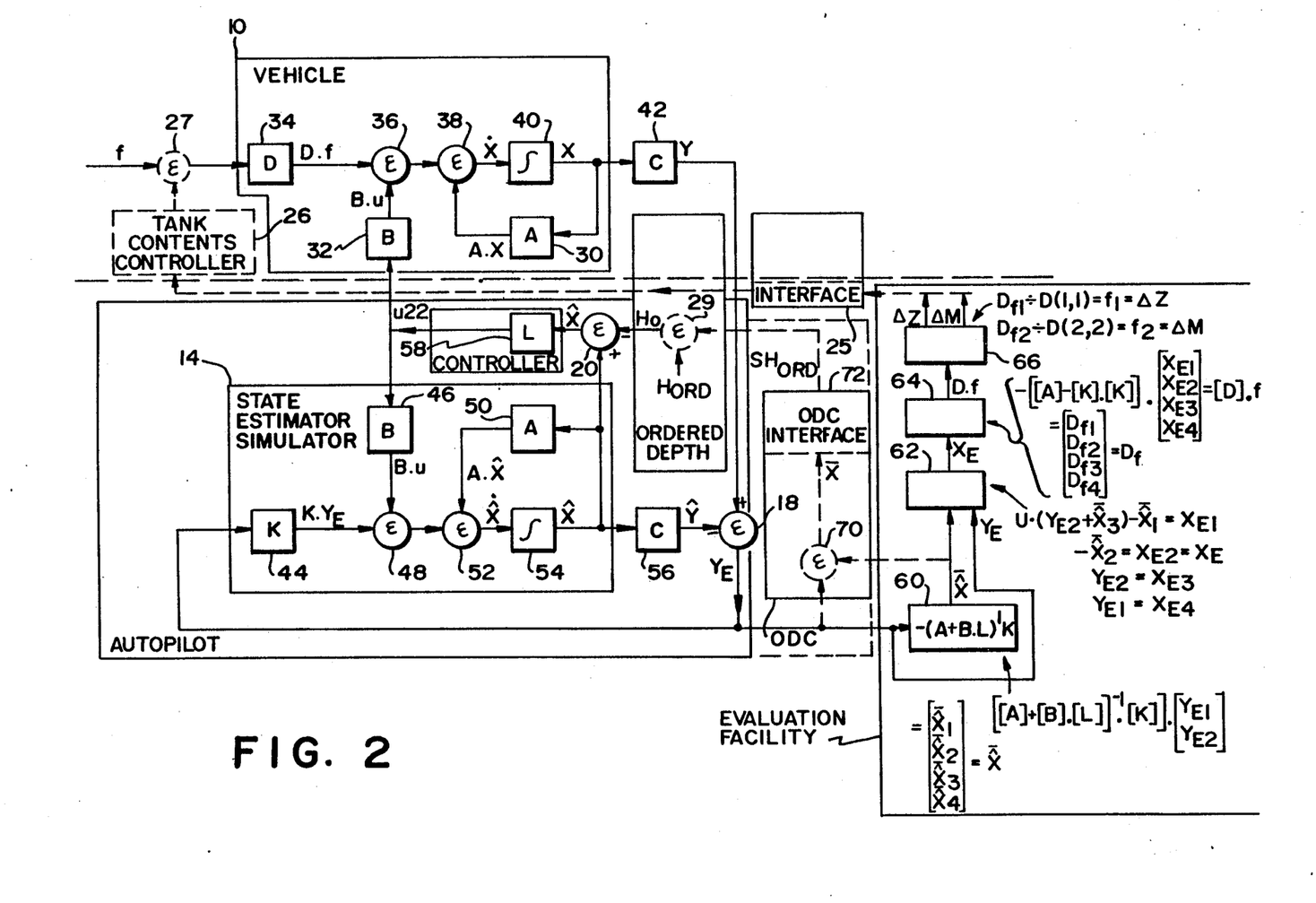
FIG. 2 is a matrix flow diagram of the system of FIG. 1, illustrating the dynamic behavior of the vehicle in accordance with describing mathematical functions, the structure of the simulator modeled by corresponding mathematical functions and the functional steps of the evaluation facility.

The matrix flow diagram for the system is shown in FIG. 2.

By a comparison of FIGS. 1 and 2, the dynamics of the vehicle 10 of FIG. 1, can be seen from FIG. 2, as being considered as representable mathematically by means 30 to perform a transformation in accordance with matrix A, means 32 to perform a transformation in accordance with matrix B, and means 34 to perform a transformation in accordance with matrix D. Each "signal" representative of an external disturbance vector f, can be considered as being supplied to the D matrix transformation means 34. Each output from the controller 22 of the autopilot, and representative of a control input vector, u, can be considered as being supplied to the B matrix transformation means 32. Instantaneous outputs from the two means, 32 and 34, can be considered as being supplied to summing means, conveniently referred to as summer, 36, the corresponding output (B.u + D.f), from the summer, being considered as being supplied to a loop. The loop comprises the matrix transformation means 30, summer 38, and a combination of integrators 40, with an integrator for each state variable. An output "signal" from the loop, comprising the corresponding outputs from the integrator combination 40, and representative of the vector of state variables X, is fed back by way of the A matrix transformation means 30 which supplies a set of values A.X, to the summer 38, arranged also to receive the instantaneous combination (B.u + D.f), from the summer 36. The effective output of the summer, $\dot{X} = (A.X + B.u + D.f)$, is supplied to the integrator combination 40 which derives an updated value of X from $\dot{X}$, $\dot{X}$ having been derived from a previously updated value of X, as the output "signal" representing the behavioral response of the vehicle to inputs f and u.

The physical part of the system is considered as being completed by the measurement means 12, of FIG. 1, comprising means 42 of FIG. 2. The measurement means 12 is considered as performing a transformation in accordance with the predetermined, measurement matrix C, on each output "signal" X from the integrator combination 40, and, in response, providing a set of values, numerical or signal levels, representative of the vector of state observations, Y.

For the autopilot, the vehicle dynamic behavior as explained above in terms of functional blocks corresponding to the mathematical equations is modeled by the state estimator 14, of FIG. 1, and represented by a portion of the matrix flow diagram, of FIG. 2, having a similar form to that considered as representing the dynamics of the physical part of the system. Each output from the first differencer 18, to the state estimator 14, and representing the instantaneous observed estimation error vector, $Y_E$, is supplied to a Kalman filter 44, to filter out noise, but considered as comprising means to perform a transformation in accordance with a gain matrix K. Each output from the controller 22 of the autopilot, and representative of the control input vector, u, is supplied to B matrix transformation means 46 of the state estimator 14. Outputs of the two means, 44 and 46, are supplied to summer 48, and, in response, a combination (B.u + K.$Y_E$), is supplied to a loop. The loop comprises matrix transformation means 50, summer 52, and a combination of integrators 54. Output values from the loop, comprising the corresponding outputs from the integrator combination 54, and representative of the vector of estimated state variables $\hat{X}$, are fed back to the A matrix transformation means 50 which supplies a set of values A.$\hat{X}$, to the summer 52, arranged also to receive the instantaneous combination (B.u + K.$Y_E$), from the summer 48. The corresponding output values from 52 and representing $\dot{\hat{X}}$ (= (A.$\hat{X}$ + B.u + K.$Y_E$)) are supplied to the integrator combination 54.

The integrator combination 54 derives an updated value of $\hat{X}$ from $\dot{\hat{X}}$, $\dot{\hat{X}}$ having been derived from a previously updated value of $\hat{X}$.

The autopilot observation model 16, of FIG. 1, comprises means 56 of FIG. 2, or a facility for performing a transformation in accordance with the predetermined, measurement matrix C, on each output value of $\hat{x}$ from the integrator combination 54. In response, the measurement means 12 provides a set of values representative of the vector of estimated state observations, Ŷ.

The controller 22, of the autopilot of FIG. 1, can be considered as comprising means 58 of FIG. 2. The means 58 is considered as performing a transformation in accordance with the matrix L on each input thereto, the each controller input being representative of the instantaneous vector of the estimated state error variables $\bar{x}$. The corresponding output from the controller 22 represents the control input vector, u.

$$u = L \cdot \bar{x}$$

The portion of the matrix flow diagram of FIG. 2 relating to the evaluation facility 24, conveniently, can be considered as having four constituent parts.

A first part 60 of the evaluation facility is arranged to multiply each value of the set representative of the observed estimation error vector, $Y_E$ supplied from the first differencer 18, by a term $-(A+B.L)^{-1}.K$. Thus, in accordance with equation (6), there is provided, in response, a set of values representative of the vector of steady state, estimated state error variables, $\bar{x}$.

The second part 62 of the evaluation facility is arranged to operate, in accordance with equations (7), (8) and (9), upon the values of the set representative of the vector x, and upon the values of the set representative of the vector $Y_E$. In response, the second part is arranged to provide a set of values representative of the estimation error vector, $X_E$.

The third part 64 is arranged to operate, in accordance with equation (5) with the vehicle presumed to be in controlled steady state, upon the values of the set representative of the vector $X_E$, and, in response, is to provide a set of values representative of the product of matrix D, and the external disturbance vector f.

The fourth part 66 is arranged to operate, in accordance with equation (10), upon the values representative of D.f providing individually at separate outputs thereof, a representative of the instantaneously computed heave force $\Delta Z$, and a value representative of the instantaneously computed pitching moment $\Delta M$, acting on the submarine.

Thus, the deficiencies of a PID control system having an autopilot with a state estimator, and with the depth error, h, being integrated to overcome the problem of depth keeping when the submarine is out-of-trim, the deficiencies being in relation to depth keeping, and pitch keeping, when the submarine is maneuvering, can be overcome without recourse to the integral term of h.

The arrangement may be such that the instantaneously computed values of the heave force $\Delta Z$, and pitching moment $\Delta M$, provided by the evaluation facility 24, are displayed for an operator on display means or other indicator for use by the submarine commander in any way desired.

The submarine may contain trim ballast adjustment means, such as tank contents controller 26, by which trim may be maintained or adjusted by varying the amount or distribution of ballast through the use of manual controls that provide trim control input signals.

A trim ballast adjustment interface 25 between the evaluation facility and the trim ballast adjustment means enables such trim control input signals to be provided on the basis of evaluated $\Delta Z$ or $\Delta M$ to counteract their effect on the submarine. The trim ballast adjustment interface may have a manual content in comprising an operator, displays for the values of $\Delta Z$ or $\Delta M$ evaluated by the evaluation facility and the aforementioned manual controls by which trim control input signals are provided in otherwise conventional manner to the tank contents controller. Such interface, and indeed the additional control loop formed by linking the evaluation facility to the trim ballast adjustment means, may be operated on a continuous basis or the operator may make adjustments only periodically on the basis of observation of the out-of-trim force values.

Having corrected for the instantaneously computed heave force $\Delta Z$, and for the instantaneously computed pitching moment $\Delta M$, any error that would carry into the steady state is also eliminated. Thus, the operator brings, and/or maintains, a submarine, subjected to a varying, or constant, disturbance, to an ordered depth, with the submarine in trim. It can be arranged that the stability of the submarine is not affected. Further, it is not essential that the submarine is in a steady state, for example, possibly the submarine maneuvering during the compensating action. The desired manner of operation of the system is unaffected by when, in a manoeuvre, a change of depth is ordered. If the autopilot includes means to limit the pitch angle of the submarine during a depth change, the effect on the desired manner of operation of the system is negligible.

In particular, in accordance with the present invention, there is required to be provided within the system a signal representative of the observed estimation error vector, $Y_E$, such as is provided inherently within a system having an autopilot with a state estimator, 14.

The observed estimation error vector, $Y_E$, has, as is required, a steady value. It is unimportant if, in fact, this vector has a mean value, the actual value varying slowly compared with the response of the system. Such a slow variation of the vector is caused by a varying, unknown, and non-zero mean, disturbance acting on the submarine, such as the so-called upward "suction force". If the observed estimation error vector, $Y_E$, has a steady value, there is a constant disturbance force acting on the submarine. This vector, desirably has a continuous form, and is of this form if the state-space equations operated upon within the system are of continuous form. For each and simplicity of explanation the autopilot and evaluation facility have been considered in terms of such continuous form, both in terms of equation relationships and the continuous nature of changes in values derived.

As stated above, the motion of the submarine is expressed by equations of state-space form, and the equation $$\dot{x} = A \cdot x + B \cdot u + \ldots$$

is in continuous form.

The corresponding equation in discrete form can be considered.

If the implementation of the system employs a digital computer, the required computations being performed discretely, at regular intervals, the discrete form of the equation should be considered, $$\dot{x}(n+1) = A_d \cdot x(n) + B_d \cdot u(n) + \ldots$$

when x(n) is the value of the vector x at the nth sample, and x(n+1) is the value of the vector at the next sample. The matrices $A_d$ and $B_d$ are closely related to those, A and B, in the continuous form. For a short update interval $\delta t$.

$$A_d = (I + A \cdot \delta t)$$

$$B_d = B \cdot \delta t$$

$$K_d = K \cdot \delta t$$

and $$D_d = D \cdot \delta t$$

where I is the identity matrix.

In relation to the matrix flow diagram, FIG. 2, the means 54 modeling the integrating behavior of the vehicle comprise a suitable form of updating means to perform the corresponding integration function on discrete samples.

The manner of operation of the evaluation facility 24 is subject to the time constants, inherently associated with the evaluation, for example in respect of equation (5). Because of such time constants, filtering of noisy signals, produced within the system, is obtained. Means to provide smoothing of noisy measurement signals, for example, due to waves, and passed to the computation means 24, may be included in the computation means, especially for when the submarine is at periscope depth under a seaway. Such smoothing is particularly important if the ballast is controlled automatically, in the manner described below.

Advantageously, but not essentially, in a system in accordance with the present invention, and as indicated in FIGS. 1 and 2, in dotted line form, both instantaneous output signals from the computation means 24, and representative of the heave force $\Delta Z$, and the pitching moment $\Delta M$, acting on the submarine, are supplied to suitable automatic, that is, non-manual, form of trim ballast adjustment interface means 25, including sign changing means. In response, the trim ballast adjustment interface means 25 produces a signal supplied to the aforementioned Tank Contents Controller 26, arranged to control the amount, and the distribution, of the ballast in the submarine. In response to each signal from the interface 25, the Tank Contents Controller 26 makes changes in the tanks' contents which will have a resultant change in the heave force, $-\Delta Z$, and a resultant change in the pitching moment, $-\Delta M$ by the pumping, flooding, and transfer of ballast.

If the pumping can occur at a high rate, it is required that the Tank Contents Controller 26 includes limiters, or other means, to ensure the stability of the control loop of which it forms a part.

As indicated in FIG. 2, the effect of the tank contents controller operation, a change in ballast, is manifested as an additional motion-disturbing force, or "signal", supplied with aforementioned external forces vector f to a summer 27, implicit in the physical part of the system. In response, the summer is considered as supplying a representation of the instantaneous value of $(f - \Delta Z - \Delta M)$, to the D matrix transformation means 34 of the vehicle dynamics.

The control system also may include an Ordered Depth Corrector (ODC), for the submarine, and indicated at 28 in FIG. 1, in dotted form.

In relation to the equations (1) to (10), derived above from the equations of motion of a submarine, it is considered that the depth of the submarine below mean surface level, H, is also represented by the element of the vector of the state variables $X_4$, and by the element of the observed estimation error vector, $Y_{E1}$. The vector representing the error of the depth of the submarine is, $$(X_{4p31} \; X_{4ORD}) = \bar{x}_4 = (\bar{x}_4 - \bar{\hat{x}}_4) + \bar{\hat{x}}_4.$$

From equation (9)

$$X_{E4} = \bar{x}_4 - \bar{\hat{x}}_4.$$

From equation (6)

$$\bar{\hat{x}} = -(A + B \cdot L)^{-1} \cdot K \cdot Y_E.$$

Hence $$\bar{x}_4 = Y_{E1} - (A + B \cdot L)^{-1} \cdot K \cdot Y_{E1} \ldots \quad (11)$$

The first term of the right hand side of equation (11) is represented by a value of each output, $Y_E$, from the first comparator 18. The second term of the right hand side of equation (11) is represented by a value of each output value, $\bar{\hat{x}}$, from the first part 60 of the computation means, shown in FIG. 2.

Thus, the Ordered Depth Corrector (ODC) 28, has two inputs, one to receive a representation of the instantaneous observed estimation error vector, $Y_E$, and supplied by the first comparator 18; and the other to receive from the first part 60 of the evaluation facility 24, shown in FIG. 2, a representation of the instantaneous vector of steady state, estimated state error variables, $\bar{\hat{x}}$. Hence, part of the Ordered Depth Corrector, (ODC) 28, can be considered to be common with the first part 60 of the computation means 24. In response, the Ordered Depth Corrector (ODC) 28, provides a value representative of the instantaneously estimated, steady state, error of the ordered depth $\delta H_{ORD}$.

The output from the Ordered Depth Corrector (ODC) 28, is supplied to summer 29, arranged also to receive the instantaneous value representative of the ordered depth of the submarine $H_{ORD}$. In response, the summer 29 provides a value representative of the ordered depth estimated in relation to the instantaneous output from the Ordered Depth Corrector, $H_o$, and considered to be a function of the ordered depth. This value is supplied to the second differencer 20, together with the instantaneous values from the state estimator 14, and representative of the vector of the estimated state variables, $\hat{X}$. The corresponding output from the second comparator 20 is representative of the modified and unmodified values of instantaneous vector of estimate state variables, that is, the vector of estimated state error variables, $\hat{x}$, partially estimated in relation to the function of the ordered depth, $H_o$, referred to above. The output from the second differencer 20 is supplied to the controller 22.

As indicated in the matrix flow diagram of FIG. 2, in accordance with equation (11) both the value from the first differencer 18, and representative of the vector $Y_{E1}$, and value from the evaluation facility 24, and representative of the vector x, are supplied to summer 70 of the Ordered Depth Corrector (ODC). The signal x is supplied from the output of the first part 60 of the evaluation facility 24, considered to be common with the Ordered Depth Corrector (ODC). Each corresponding output from the summer 70 represents the instantaneous value of the appropriate one of the vector of state error variables, in relation to the steady state, $\bar{x}_4$. This value is supplied to interface 72, included in the Ordered Depth Corrector, and arranged to operate upon the signal, principally introducing a sign change, and producing the required representation of the instantaneously estimated error of the ordered depth, $-\delta H_{ORD}$, for summation with the ordered depth $H_{ORD}$.

The Ordered Depth Corrector, 28, advantageously, has associated therewith a time constant, such that its output does not fluctuate undesirably when the submarine is at periscope depth under a seaway.

The Ordered Depth Corrector is concerned with only one variable, the depth of the submarine. The Ordered Depth Corrector computes, in real time, the steady state error, or offset, of depth, and applies an opposite, compensating, offset to the ordered value and influences the submarine controls by way of the control input u. Thus, for a submarine which is to change, or is changing, depth, the Ordered Depth Corrector operates upon the disturbance vector f, during the depth change. By the time the submarine has arrived at the ordered depth, the compensating offset has already been computed, and operated upon, and the final depth is the ordered depth. Applied limits, for example, to hydroplane deflections, or pitch angle, have only minimal effects on the computation, and these effects disappear as the manoeuvre is completed. The submarine may be subjected to a varying, or constant, disturbance.

However, the Ordered Depth Corrector is not concerned with, and operates independently of, and notwithstanding, the out-of-trim parameters associated with the submarine, and cannot quantify the heave force $\Delta Z$, and the pitching moment $\Delta M$.

The Ordered Depth Corrector computes the relevant steady state error, and as with the evaluation facility, it is not necessary for the submarine to be in a steady state for the Ordered Depth Corrector to operate satisfactorily.

The Ordered Depth Corrector is capable of operating satisfactorily, because a change of the ordered depth caused thereby, does not cause any consequent change of any other state variable of the submarine.

Further, any change of ordered depth caused by the Ordered Depth Corrector does not affect the stability of the submarine. The desired manner of operation of the Ordered Depth Corrector is unaffected by when, in a manoeuvre, a change of depth is commanded.

As for the evaluation facility 24, the Ordered Depth Corrector 28 requires there to be provided within the system a signal representative of the observed estimation error vector, $Y_E$, such as is provided inherently within a system having an autopilot with a state estimator 14.

A trim ballast adjustment interface which as indicated above, permits manual discretion on when to apply trim control input signals to the illustrated Tank Contents Controller 26, enables the control system to be operated in the so-called quick trim mode. An operator, observing the displayed heave force, and pitching moment, values, periodically can initiate this mode.

Changes to the dynamics of a submarine caused by ballast changes, inherently, are slower than changes to the dynamics caused by hydroplane deflection, or thruster, changes. An Ordered Depth Corrector 28 is concerned only with required hydroplane deflection, or thruster, changes; and the evaluation facility 24 is concerned only with required changes of the ballast of the submarine.

Inherently, the output of the Ordered Depth Corrector (ODC) 28, is independent of the output of the evaluation facility 24, and so the optimum arrangement is for the system to include both the computation means 24, and the Ordered Depth Corrector 28, operating simultaneously. Thus, the Ordered Depth Corrector 28, can bring the submarine to an ordered, steady state, depth by hydroplace control faster than by an adjustment of ballast caused, or indicated, by the evaluation facility, 24. In this mode the system performs, automatically, procedures whereby ballast and trim errors are reduced to nominal zero. Concurrently with the submarine being brought to trim, in accordance with the output of the evaluation facility, by trim ballast adjustment, hydroplane angles, adjusted by the ODC to achieve a similar results, reduce until they are the same as the so-called set balance angle. The equivalent hydroplane angles maintain the steady state set depth, and are referenced to balance angles, the depth being set by the controller of the autopilot, so as to obtain a desired state variable value.

In the absence of an Ordered Depth Corrector, the submarine commander may upon observation of displayed values of $\Delta Z$ and $\Delta M$, initiate the change of hydroplane control angles in a sense to counteract the disturbing forces until ballast adjustment alone is effective.

A control system in accordance with the present invention may be for a missile, airship, aircraft, or surface ship, instead of for a submarine.

If the system is for a missile, airship, or aircraft, and the ordered state is the height of the vehicle, and if the system includes an Ordered State Corrector, then the Corrector comprises an Ordered Height Corrector, instead of the Ordered Depth Corrector for a submarine.

Conveniently, computations to be performed, by constituent portions of the system, except the physical part of the system, that is, the measurement means 12 and manual form of trim ballast adjustment interface, are obtained by programming a computer of the system, in the appropriate manner, in accordance with predetermined algorithms to perform the function of evaluation facility substantially as outlined above in addition to the functions of autopilot means as is already known.

That is, such computer has input means arranged to receive the set of observed state values (Y) from measurement means 12, data relating to the motion of the vehicle, in particular the forward velocity U, and any ordered values of state variable such as depth $H_{ORD}$; output means by which to deliver the control input u and the values for $\Delta Z$ and $\Delta M$; and stored in the computer the constant parameters of the vehicle, A, B, C, D, K and L and a program to effect the above described autopilot function and the evaluation facility and, if appropriate, the Ordered Depth Corrector.

I claim:

1. A control system for a fluid borne vehicle, described behaviorally by a set, comprising a vector, of state variables, said system including
   (a) vehicle controls to effect, with vehicle motion, changes to said state variables in response to control inputs,
   (b) measurement means to provide a set of observed state values representative of at least some state variables of the vehicle,
   (c) autopilot means operable
      (i) to simulate the behavioral response of the vehicle to values of control inputs to produce a set of values representative of estimated state variables, (ii) to observe at least the estimated state variables corresponding to the state variables observed by the measurement means, and (iii) to cause, by way of said control inputs, the vehicle to assume a steady state condition in relation to state variables observed at which motion-disturbing out-of-trim forces acting on the vehicle are compensated for, and (d) an evaluation facility responsive to relationships assumed in such a steady state condition between vehicle motion defined by the autopilot means and a set of observed estimation error values, between observed state variables and observed estimated state variables, that is attributable, in such steady state condition, to motion-disturbing out-of-trim forces to derive, from a set of instantaneously observed estimation error values, values of said motion-disturbing forces.

2. A control system as claimed in claim 1 including trim ballast adjustment means responsive to trim control input signals to vary the trim ballast of the vehicle in relation to the fluid and a trim ballast adjustment interface operable to transform said derived values of motion-disturbing out-of-trim forces to trim control input signals of said trim ballast adjustment means.

3. A control system as claimed in claim 2 in which the trim ballast adjustment interface comprises an operator, display means operable to display said values of motion-disturbing out-of-trim forces derived by the evaluation facility to, and be observed by, the operator and trim control input means responsive to manipulation by said operator to generate trim control input signals in accordance with the values of motion-disturbing out-of-trim forces observed by the operator.

4. A control system as claimed in claim 2 in which the trim ballast adjustment interface is responsive to the values of motion-disturbing out-of-trim forces derived by the evaluation facility to generate trim control input signals of such magnitude related thereto and sense as to cause elimination of said out-of-trim forces by the trim ballast adjustment means.

5. A control system as claimed in claim 2 in which the autopilot means is arranged for obtaining and maintaining an ordered vertical position of the vehicle with respect to a means fluid surface level, the vector of state variables being defined by change of heave velocity, change of pitch velocity, change of pitch angle and displacement of the center of gravity of the vehicle from means surface level respectively, and said motion disturbing out-of-trim forces comprising out-of-trim heave force and out-of-trim pitching moment respectively, and in which the measurement means is arranged to provide observed values of said vertical position of the center of gravity of the vehicle with respect to means surface level, and of the change of pitch angle and the input means is arranged to receive a value related to an ordered value for said vertical position only.

6. A control system as claimed in claim 5 in which the trim ballast adjustment means comprises a vehicle buoyancy controller operable to control the amount and distribution of ballast in the fluid-borne vehicle in response to trim control signals representing out-of-trim heave force and out-of-trim pitching moment, determined by the evaluation facility and provided by way of the trim ballast adjustment interface.

7. A control system as claimed in claim 6 in which the vehicle is a submarine whose vertical position with respect to the means fluid surface level is its depth, the measurement means being arranged to provide observed values of depth and change of pitch angle and the autopilot means being arranged to receive a value related to an ordered value for said depth.

8. A control system as claimed in claim 5 in which the evaluation facility comprises a first part operable to determine from the instantaneously observed estimation error vector values ($Y_E$) and transformation coefficients employed within the autopilot means (A, B, L, K) a set of values representing a vector of estimated state error variables in an anticipated or achieved steady vertical position with respect to ordered values of state variables ($\bar{x}$), a second part operable in accordance with relationships between, and values of, state error variables ($\bar{x}$) inherent in a controlled steady vertical position ($\bar{x}_2 0, \bar{x}_1 = u.\bar{x}_3$), and to the relationship between the state error variables for vertical position and pitch angel observed ($\bar{x}_{34}$), observed estimation error vector ($Y_E$) and vector of estimated state error variables ($\bar{x}$) to determine, from said instantaneously observed estimation error values ($Y_E$), steady vertical position vector of estimated state variables ($\bar{x}$) and vehicle forward velocity (U), a set of values representing an estimation vector ($X_E$) equally applicable to a controlled steady vertical position, a third part operable to provide from said set of values representing an estimation error vector ($X_E$) applicable to a steady state condition a set of values representing constant disturbance to motion of the body (D.f or Df), and a fourth part operable to determine from said motion disturbance of the vehicle and the relationships between parameters of the vehicle relating motion-disturbing our-of-trim forces to such motion (D), values of such forces as provide said constant disturbance to motion ($D_{f1}/D(1,1)$ and $D_{f2}/D(2,2)$).

9. A control system as claimed in claim 8 including means operable (i) to correct the ordered vertical position ($H_{ORD}$) of the vehicle in accordance with the error of vertical position of the vehicle as represented by the constituent of a vector of state error variables representing vertical position with the vehicle considered as being in a controlled steady state ($\bar{x}_4$) and provide a corrected ordered vertical position ($H_o$) to the autopilot means, and (ii) to determine from the difference between the instantaneous observed estimation error vector ($Y_{E1}$), that comprises the constituent part of the estimation error vector ($X_{E4}$) related to said observed vertical position, and the constituent part of the vector of estimated state error variables related to said vertical position ($\bar{x}_4$) said value of appropriate state error variable with the vehicle considered as being in the controlled steady state condition.

10. A control system as claimed in claim 1 in which the evaluation facility comprises a first part operable to determine from the instantaneously observed estimation error vector values ($Y_E$) and transformation factors employed within the autopilot (A, B, L, K) a set of values representing a vector of estimated state error variables in an anticipated or achieved steady state with respect to ordered values of state variables ($\bar{x}$), a second part operable in accordance with relationships between, and values of, state error variables inherent in a controlled steady state and to the relationship between the state error variables observed, vector of estimated state error variables ($\bar{\bar{x}}$), observed estimation error vector values ($Y_E$), the transformation factor relating the state and observed state variables vectors (C) and the velocity of the vehicle (U) to determine, from said instantaneously observed estimation error values ($Y_E$), velocity of the vehicle and said vector of estimated state variable for said anticipated or achieved steady state, a set of values representing an estimation error vector ($X_E$) equally applicable to a controlled steady state position, a third part operable to provide from said set of values representing an estimation error vector ($X_E$) applicable to a steady state condition a set of values representing constant disturbance to motion of the body (D.f or $D_f$), and a fourth part operable to determine from said motion disturbance of the vehicle and the relationships between parameters of the vehicle relating motion-disturbing out-of-trim forces to such motion (D), values of such forces as provide said constant disturbance to motion ($D_{f1}/D(1,1)$ and $D_{f2}/D(2,2)$).

11. A control system as claimed in claim 10 including means operable
  (i) to correct an ordered state variable of the vehicle in accordance with the error of said vehicle state variable as represented by the appropriate constituent of a vector of state error variables with the vehicle considered as being in the steady state, ($\bar{x}_4$) and
  (ii) to determine, from the difference between the instantaneous observed estimation error vector ($Y_{E1}$) that comprises the constituent part of the estimation error vector ($X_{E4}$) related to said observed state variable, the transformation matrix relating states and observations (C) and the constituent part of the vector of estimated state error variables related to said state variable provided by the first part of the evaluation facility ($\bar{x}_4$), said value of appropriate constituent of state error variable with the vehicle considered as being in the controlled steady state condition.

12. A control system as claimed in claim 1 in which the autopilot means and evaluation facility comprise a computer having input means, arranged to receive said set of observed state values, data relating to the motion of the vehicle and ordered values of state variables, output means and stored in the computer constant parameters of the vehicle and a program, said computer being operable in accordance with the program (i) to simulate the response of the vehicle to control inputs and additional stimuli to produce said set of estimated state variables, (ii) to observe at least the estimated state variables corresponding to the state variables observed by the measuring means, (iii) to determine the instantaneous differences between corresponding variables of the observed state variables and observed estimated state variables as an instantaneous observed estimation error vector and provide said differences as additional stimuli to update the simulation function, (iv) to derive from the set of estimated state variables and the ordered values of state variables input a set of control inputs, (v) to provide the values of said set of control inputs for updating simulation of vehicle response, (vi) to output said set of control inputs to the vehicle controls to station the vehicle in accordance with any ordered state variable and the estimated state variables in a controlled steady state condition at which motion-disturbing out-of-trim forces acting as additional stimuli on the vehicle are compensated for, and (vii) to evaluate, from stored relationships existing between the set of observed estimation error variables and state space equations of the vehicle when held in a controlled steady state condition with respect to each ordered state variable and from the instantaneous values of the set of observed estimation error variables, instantaneous values for motion-disturbing out-of-trim forces and present said values at the output means.

13. A control system as claimed in claim 1 in which the autopilot means further includes input means operable to receive at least one value, each such value related to an ordered value of at least one state variable, and is also operable
  (ii) to determine the difference between the observed state variable values and observed estimated state variable values and provide the resultant vector of observed estimation error values with said set of control input values for simulation of the behavioral response of the vehicle in order to reduce errors in the vector of estimated state variables produced thereby,
  (iv) to modify at least one variable of the vector of estimated state variable values in accordance with an ordered value of the variable provided by the input means and provide, from said modified and unmodified values of the estimated state variables, a set of values representative of a vector of estimated state error variables, and
  (v) to derive, in response to said vector of estimated state error variables, control inputs for the vehicle controls associated with said state variables and apply them to the vehicle controls and to said simulation, and in which the evaluation facility is responsive to the vector of instantaneous observed estimation error values determined by the autopilot means to determine from said values and said steady state condition relationships the values of motion-disturbing out-of-trim forces acting on the vehicle.

14. A control system for a fluid borne vehicle, described behaviourally by a set, comprising a vector, of state variables, said system including
  (a) vehicle controls to effect, with vehicle motion, changes to said state variables in response to control inputs,
  (b) measurement means to provide a set of observed state values representative of at least some state variables of the vehicle,
  (c) autopilot means operable
    (i) to simulate the behavioral response of the vehicle to values of control inputs to produce a set of estimated state variables,
    (i) to observe at least the estimated state variables corresponding to the state variables observed by the first measuring means, and
    (iii) to cause, by way of said control inputs, the vehicle to assume a steady state condition in relation to state variables observed at which motion-disturbing out-of-trim forces acting on the vehicle are compensated for, and (d) trim ballast adjustment means responsive to trim control input signals to vary the trim of the vehicle in relation to the fluid by variation in ballast and its distribution, (e) an evaluation facility responsive to a set of instantaneously observed estimation error values, between observed state variables and observed estimated state variables, to determine therefrom the values of motion-disturbing out-of-trim forces acting on the vehicle, and (f) a trim ballast adjustment interface operable to relate said derived values of out-of-trim forces to trim control input signals for such trim ballast adjustment means for elimination of said motion-disturbing out-of-trim forces.

15. A method of estimating out-of-trim forces acting on a fluid-borne vehicle whose behavior in motion is described by a set, comprising a vector, of state variables and which vehicle includes, in addition to controls for interacting with the fluid to effect with the vehicle motion, changes to said state variables and means to observe at least some of the state variables, means to perform an autopilot function by simulating behavioral response of the vehicle to values of control inputs applied to the vehicle to provide a vector of estimated state variables, observing at least some of the estimated state variables corresponding to the observed state variables, determining the instantaneous difference between the observed state variable values and observed estimated state variable values and providing the resultant instantaneously observed estimation error vector with said control inputs for said simulation of behavioral response of the vehicle in order to reduce errors in the vector of estimated state variables and deriving from said estimated state variables from the simulation, modified in accordance with input ordered values of state variables, representing estimated state errors, control inputs for the controls and simulation, the method comprising (i) deriving from the set of values comprising the instantaneously observed estimation error vector ($Y_E$) the values of the vector of estimated state error variables with the vehicle established in a steady state condition, ($\bar{x}$)

(ii) deriving from said values of the vector of estimated state error variables in the steady state and from the instantaneously observed estimation error vector, in accordance with relationships existing in the steady state between the vector of estimated state error variables, ($\bar{x}$) observed estimation error vector ($Y_E$), relationship between state and estimated state variables and observed values thereof (C) and the forward velocity of the vehicle (U), an estimate of the values representing a steady state estimation error vector relating the behavior of the vehicle and simulator ($X_E$), (iii) deriving from the values estimated for the steady state estimation error vector ($X_E$), in accordance with relationships existing in the steady state condition between the steady state estimation error vector and behavioral parameters of the vehicle, (equation 5) a set of values representing a vector of the vehicle motion components attributable to motion-disturbing out-of-trim forces but compensated for by the autopilot in such steady state condition (D.f or $Df$) and (iv) deriving, from said vector of vehicle motion components attributable to motion-disturbing out-of-trim forces and constants of the vehicle relating forces acting thereon to said motion components (D), estimates to the values of motion-disturbing out-of-trim forces acting on the vehicle.

* * * * *

UNITED STATES PATENT AND TRADEMARK OFFICE
CERTIFICATE OF CORRECTION

PATENT NO. : 5,053,969
DATED : October 1, 1991
INVENTOR(S) : Thomas B. Booth

It is certified that error appears in the above-identified patent and that said Letters Patent is hereby corrected as shown below:

Col. 24, line 21, "$(\bar{x}_2 0, \bar{x}_1 = u.\bar{x}_3)$" should be -- $(\bar{x}_2 = 0, \bar{x}_1 = u.\bar{x}_3)$ --

Col. 24, line 39, "our-of-trim" should be -- out-of-trim --.

Col. 26, line 22, "(ii)" should be --(iii)--.

Col. 26, line 61, "(i)" should be --(ii)--.

Col. 28, line 25, delete "(equation 5)".

Signed and Sealed this

Twenty-eighth Day of December, 1993

Attest:

BRUCE LEHMAN

Attesting Officer    Commissioner of Patents and Trademarks